April 4, 1961 W. C. FAIX 2,977,823
SLOTTER KNIVES AND METHOD OF MAKING SAME
Filed Dec. 17, 1958
FIG_1
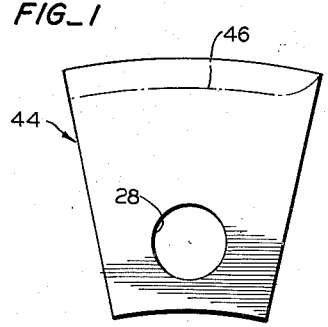
FIG_2
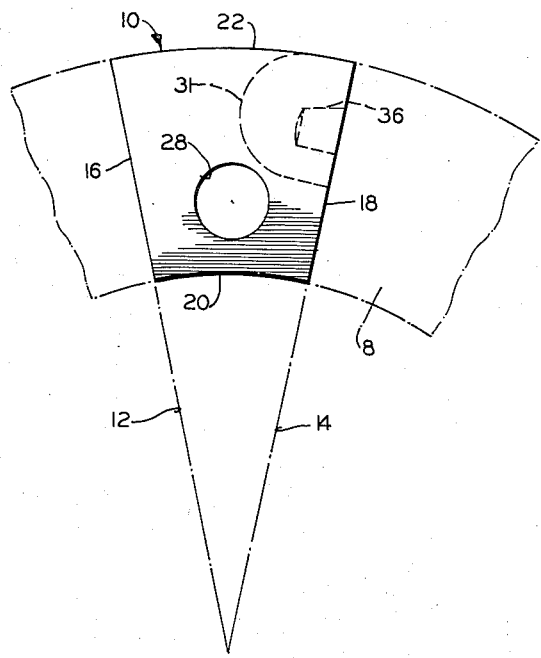
FIG_3
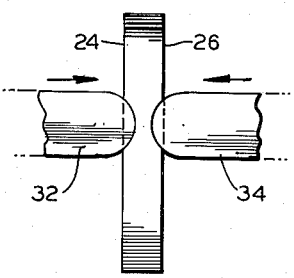
FIG_4
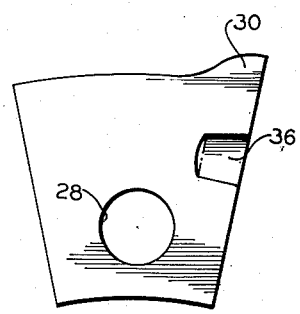
FIG_5
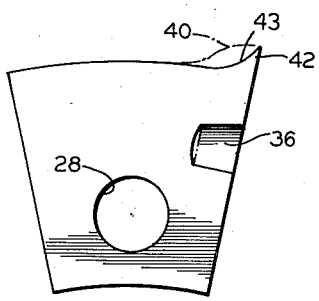
FIG_6
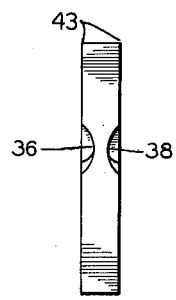
INVENTOR.
WILLIAM C. FAIX
BY
*Naylor & Neal*
ATTORNEYS

United States Patent Office 2,977,823
Patented Apr. 4, 1961

2,977,823

SLOTTER KNIVES AND METHOD OF MAKING SAME

William C. Faix, Cupertino, Calif., assignor, by mesne assignments, to Russell T. Conn, Los Altos Hills, Calif.

Filed Dec. 17, 1958, Ser. No. 781,055

9 Claims. (Cl. 76—101)

This invention relates in general to slotter knives and more particularly, to male-tipped slotter knives and an improved method for their manufacture.

In the making of boxes from corrugated board or similar material, it is common practice to employ male-tipped slotter knives for removing certain prescribed areas of the box-forming blanks to facilitate their subsequent make-up into boxes.

Typically used in such operation are knives of sector shape formed from annular rings and provided with projecting cutting tips at their outer corners. The usual method of making these knives has been to machine or otherwise form from metal, a flat-faced annular blank of oversize outer diameter, thereafter cutting the blank into sectors and shaping the cutting tip at a sector outer corner by machining away a large portion of the arcuate outer surface of the sector, and finally, grinding a sharp edge upon said cutting tip. This procedure obviously requires considerable time for the machining of the protuberant cutting tip and entails, as well, the loss of a substantial amount of tool metal during the machining.

It is an object of this invention to provide a method for making slotter knives of the above character which, by eliminating the necessity for the extensive machining of the outer arcuate edge of the knife blank, reduces production time and waste of material, considerably reducing the cost of producing the finished slotter knives.

Another object of this invention is to provide a slotter knife of the character described, formed in the manner disclosed.

Other objects and advantages of the invention will be apparent from the following description taken in conjunction with the drawings forming a part of this specification in which:

Figure 1 is a view in plan of a slotter knife blank conventionally formed in sector shape with an oversize outer diameter, the final configuration of the knife being indicated in phantom outline;

Figure 2 is a view similar to that of Figure 1 of the slotter knife blank utilized in this invention in which the original outer diameter of the blank is substantially retained;

Figure 3 is a view in end elevation illustrating a pair of male-tipped punches as positioned during the forging operation;

Figure 4 is a view in plan showing the protuberance formed at an outer corner of the blank after the forging operation;

Figure 5 is a view in plan, similar to that of Figure 4, of the finished slotter knife after machining of the protuberance to form the slotter knife tip; and Figure 6 is a view in end elevation of the finished knife of Figure 5.

Referring now to the drawings, there is shown in Figure 2, in phantom outline, a fragmentary portion of a metal annulus 8 of uniform rectangular cross-section from which is cut a slotter knife blank 10 in the shape of a sector as included between the defining annulus radii 12 and 14. Blank 10 is bounded by straight sides 16 and 18, inner and outer margin arcuate surfaces 20 and 22, and upper and lower surfaces 24 and 26, and is provided with an aperture 28.

After cutout, the blank 10 is subjected to a forging operation to form the protuberance 30 thereon (Figure 4) which projects outwardly from the outer surface 22 of the blank to define, with side 18, the outer righthand corner of the blank. In forging the protuberance, heat is first applied to soften the metal at the corner of the blank at which the protuberance 30 is to be formed, such heated corner area being generally indicated by dotted outline 31. A pair of aligned male-tipped punches 32 and 34, disposed at opposite sides of the heated area and in right angle relationship with the upper and lower surfaces of the blank, are then driven by a punch press (not shown) into engagement with the softened metal at positions immediately adjacent side 18 and intermediate the inner and outer extremities of the heated area, displacing the heated metal outwardly to form protuberance 30, while at the same time effecting the formation of recesses 36 and 38 in the upper and lower surfaces of the softened metal. In use with slotter knife blanks of approximately 5/16 of an inch in thickness, it has been found desirable to provide the punches 32 and 34 with tips of approximately ½ inch radius.

Although the protuberance 30, for purposes of illustration, is shown positioned at the outer righthand corner of the blank, it may as well be positioned at the outer lefthand corner by heating the corner area thereat in a similar fashion and applying the deforming forces in the manner above indicated. From Figure 6, it may be noted that the blank 10 is dimensionally affected by the above described forging operation only in the vicinity of the protuberance 30 and at the location where the punches 32 and 34 are directed against the softened metal of the blank. Thus, the thickness of the blank 10, including that of the protuberant portion 30, and its characteristically rectangular cross-section, are substantially unaffected by the forging operation. This is important in the ultimate formation of the cutting tip since the relation of the curved top and bottom or cutting edges of the tip, i.e., their spacing and orientation, is determined by the initial configuration of the blank.

After the forging of the protuberance 30 upon blank 10 (Figure 4), the blank is cooled in preparation for the final step which, as shown in Figure 5, comprises removing, as by grinding, that portion of the protuberance 30 bounded by broken line 40, to shape a sharp cutting tip 42. This tip is of chisel shape and bounded by a pair of parallel curved cutting edges 43.

A comparison of Figures 1 and 5 will readily indicate the superiority of the method of this invention over the conventional methods utilized for the production of slotter knives, in which latter is utilized a slotter knife blank 44 (Figure 1) generally similar to that of Figure 2, but fabricated with an oversize outer diameter and thereafter laboriously ground down to the final outer surface configuration represented in phantom outline (Figure 1) to form the protuberant cutting tip.

In contrast, reference to Figure 5 indicates the relatively small amount of material which must be removed in the final grinding operation in the method of this invention, which accordingly accounts for the substantial saving of time and material and the resultant reduction of production costs thereby effected.

It will be appreciated that the embodiment of this invention as herein described may be altered, changed or modified without departing from the scope of the invention as herein claimed.

What is claimed is:

1. A method of manufacturing a slotter knife comprising the steps of removing a blank of sector shape from an annulus, heating an outer corner portion of said blank to effect a softening thereof, driving a pair of aligned and oppositely directed punches into engagement with the upper and lower surfaces of said heated and softened corner portion to reduce the blank thickness over a limited area extending immediately adjacent a corner-bounding straight side of the blank and terminating substantially inwardly of the blank's curved outer margin thereby to urge a portion of the metal of said heated corner portion outwardly to form upon said blank a corner protuberance the thickness of which is unaffected by the action of said punches, and thereafter grinding said protuberance to shape a cutting tip, after first cooling said heated corner portion.

2. A method of manufacturing a slotter knife comprising the steps of removing a blank of sector shape from an annulus, heating an outer corner portion of said blank to effect a softening thereof, applying punch forces to the upper and lower surfaces of said softened outer corner portion only at locations immediately adjacent the corner bounding straight side of the sector and substantially inwardly of its curved outer margin thereby to urge a section of the heated metal of said corner portion outwardly without effecting a change in the thickness of the section to form a corner protuberance upon said blank, and thereafter grinding said protuberance to shape a cutting tip, after first cooling said heated section.

3. A method of manufacturing a slotter knife comprising steps of removing a blank of sector shape from an annulus, heating an outer corner portion of said blank to effect a softening thereof, forging said corner portion of said blank by applying to its upper and lower surfaces deforming forces, said forces being applied only over relatively limited opposed areas located interiorly of the blank to produce an outwardly extending protuberance at said corner portion whose thickness is substantially unaffected by said deforming forces, and, after cooling said heated corner portion, shaping a cutting tip from said protuberance.

4. A method of manufacturing a slotter knife from a blank of sector shape comprising the steps of heating an outer corner portion of said blank to effect a softening thereof, driving a pair of aligned and oppositely directed punches into engagement with the upper and lower surfaces of said heated and softened corner portion only at locations immediately adjacent a corner bounding straight side of the blank and substantially displaced from the blank curved outer margin to urge a part of the metal of said heated corner portion outwardly to form a corner protuberance upon said blank the thickness of which is unaffected by the action of said punches, and thereafter grinding said protuberance to shape a cutting tip, after first cooling said part of the heated corner portion.

5. A method of manufacturing a slotter knife from a blank of sector shape comprising the steps of forging a corner portion of said blank by applying to its upper and lower surfaces forming forces to reduce the thickness of a portion of the blank inwardly of its curved outer margin while maintaining substantially unchanged the thickness of the portion of the blank outwardly thereof to produce an outwardly extending protuberance at said corner portion, and thereafter shaping a cutting tip from said protuberance.

6. A method of manufacturing a slotter knife with a protuberant cutting tip comprising applying oppositely directed forging forces to the top and the bottom surfaces of a blank over limited areas substantially displaced from the blank outer margin thereby reducing the thickness of a limited portion of the blank while at the same time urging another portion thereof outwardly along a line of direction which is at a right angle with respect to the line of movement of said forging forces to form a protuberance the thickness of which is unaffected by said forging forces, and thereafter shaping said protuberance to produce said cutting tip.

7. A method of manufacturing a slotter knife with a protuberant cutting tip comprising reducing the thickness of a limited interior portion of a blank adjacent one of its sides by applying a forging force thereat while maintaining unchanged the thickness of the portion intermediate said interior portion and the blank outer margin thereby to urge said intermediate portion outwardly along a line of direction which is at a right angle with respect to the line of movement of said forging force to form a protuberance, and thereafter shaping said protuberance to form a cutting tip.

8. A method of manufacturing a slotter knife with a protuberant cutting tip comprising reducing the thickness of a limited interior portion of a blank by applying to the blank upper and lower surfaces oppositely directed forging forces thereby to urge outwardly along a line of direction which is at a right angle with respect to the line of movement of said forging forces a portion of said blank disposed intermediate said interior portion and the blank outer margin to form a protuberance the thickness of which is unaffected by said forging forces, and thereafter shaping said protuberance to form said cutting tip.

9. As an article of manufacture, a slotter knife having a protuberant cutting tip, said slotter knife being formed from a blank by applying forging forces to its top and bottom surfaces over limited areas substantially displaced from the blank outer margin thereby reducing the thickness of a limited portion of the blank while at the same time urging another portion thereof outwardly to form a protuberance the thickness of which is unaffected by said forging forces and from which said tip is shaped.

References Cited in the file of this patent

UNITED STATES PATENTS

| | | |
|---|---|---|
| 490,773 | Osborne | Jan. 31, 1893 |
| 655,484 | Hannum | Aug. 7, 1900 |
| 1,336,576 | Nichols | Apr. 13, 1920 |
| 1,714,661 | Crawford | May 28, 1929 |
| 2,467,302 | Forster et al. | Apr. 12, 1949 |
| 2,485,020 | Staude | Oct. 18, 1949 |